United States Patent
Allen

(10) Patent No.: US 9,727,726 B1
(45) Date of Patent: Aug. 8, 2017

(54) INTRUSION DETECTION USING BUS SNOOPING

(71) Applicant: Amazon Technologies, Inc., Reno, NV (US)

(72) Inventor: Nicholas Alexander Allen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/135,170

(22) Filed: Dec. 19, 2013

(51) Int. Cl.
*G06F 7/04* (2006.01)
*G06F 17/30* (2006.01)
*H04N 7/16* (2011.01)
*G06F 21/55* (2013.01)

(52) U.S. Cl.
CPC .................................. *G06F 21/55* (2013.01)

(58) Field of Classification Search
CPC ...................................................... G06F 21/55
USPC ........................................................... 726/23
See application file for complete search history.

(56) References Cited

U.S. PATENT DOCUMENTS

| | | | |
|---|---|---|---|
| 7,702,826 B2 * | 4/2010 | Oztaskin | G06F 13/28 709/212 |
| 8,315,991 B2 * | 11/2012 | Mandagere et al. | 707/690 |
| 8,510,829 B2 * | 8/2013 | Mohandas et al. | 726/22 |
| 2005/0086523 A1 * | 4/2005 | Zimmer et al. | 713/201 |
| 2009/0216910 A1 * | 8/2009 | Duchesneau | 709/250 |
| 2011/0010713 A1 * | 1/2011 | Matsumoto et al. | 718/1 |
| 2012/0005401 A1 * | 1/2012 | Anand et al. | 711/6 |
| 2014/0173091 A1 * | 6/2014 | Lipstone et al. | 709/224 |

* cited by examiner

Primary Examiner — Taghi Arani
Assistant Examiner — Khalil Naghdali
(74) Attorney, Agent, or Firm — Davis Wright Tremaine LLP

(57) ABSTRACT

Remote computing resource service providers allow customers to execute one or more applications in a virtual environment on computer systems provided by the computing resource service provider. The customer applications are generally executed by multiple virtual machine instances working together. The virtual machines may be managed by a hypervisor executing on computer systems operated by the service provider. These computer systems may be vulnerable to intrusions and other malicious attack, thereby exposing the virtual machines and corresponding customer applications executing on the computer systems. A monitoring device may be used in one or more of the computing systems, operated by the service provider, in order to monitor and prevent a variety of different attacks.

20 Claims, 9 Drawing Sheets

INTRUSION DETECTION USING BUS SNOOPING

BACKGROUND

The use of remote computing services, such as remote program execution and remote data storage, has greatly increased in recent years. Customers may reduce expenses and overhead by purchasing these services from a computing resource service provider (also referred to as a service provider). Customer applications may be distributed over multiple virtual machine instances and computing systems. The virtual machine instances may be controlled by a hypervisor operating on a computing system. The hypervisor may provide secure partitioning of computer system resources by executing multiple virtual machine instances on a single physical host machine. Various components of the hypervisor may require privileged access to the physical host machine in order to provide effective administration of the virtual machine instances. Although reasonable precautions may be taken when developing hypervisors, reducing the risk of such attacks is a complex endeavor, typically requiring a lot of skill and resources.

BRIEF DESCRIPTION OF THE DRAWINGS

Various embodiments in accordance with the present disclosure will be described with reference to the drawings, in which.

DETAILED DESCRIPTION

Figure 1:
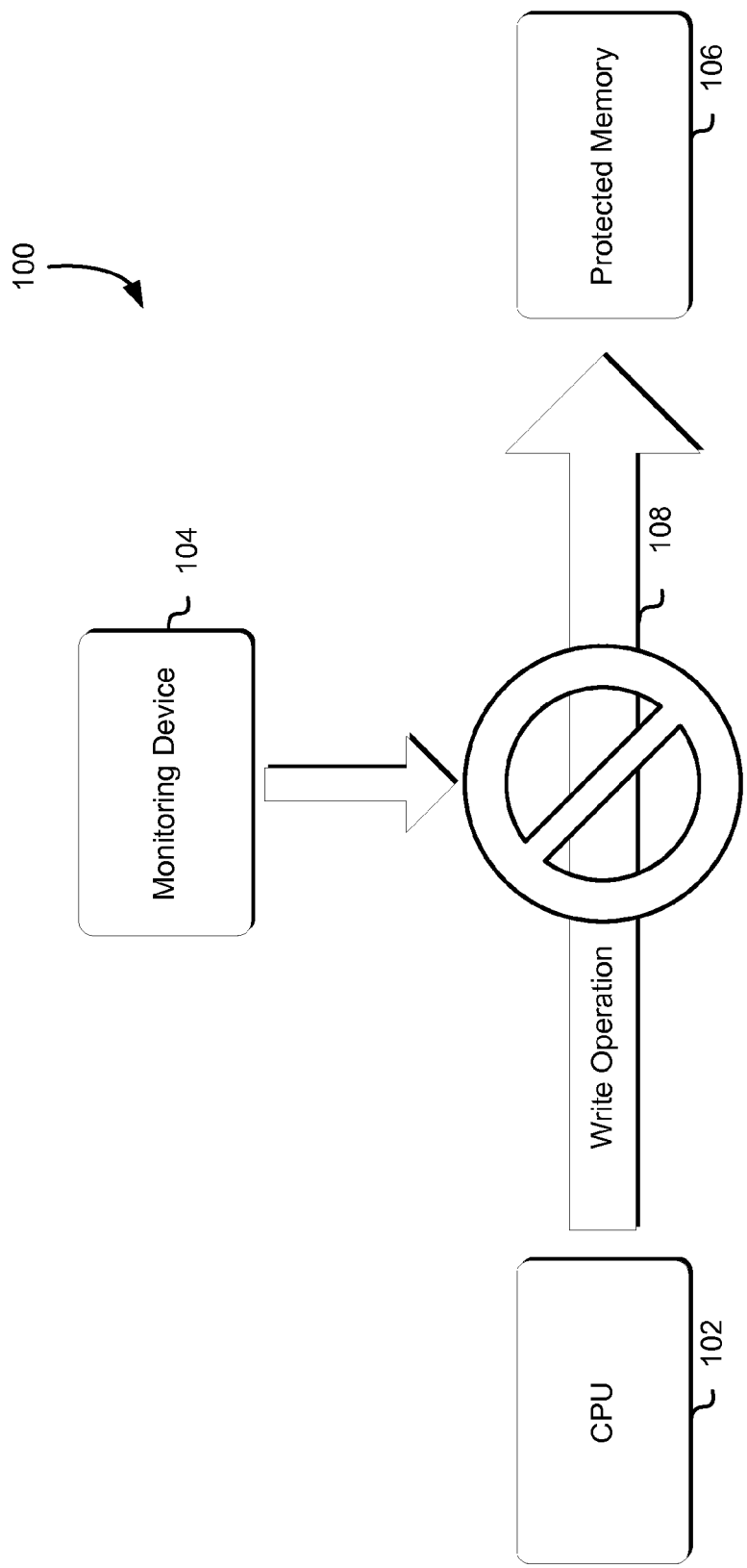
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for intrusion detection and prevention for computer systems executing hypervisors and virtual machine instances (also referred to as instances). Aspects of the present disclosure may be used to provide a hardware monitoring device (also referred to as a monitoring device) to detect or prevent certain types of intrusions against one or more hypervisors executing on a computer system. The monitoring device may "snoop" communications over a computer system bus (also referred to as a bus) by coupling to the bus in a transparent pass-through fashion such that communication may be received by the monitoring device without interference. For example, the monitoring device may include a physical tap to one or more motherboard traces (or other types of conductive wires) corresponding to the bus enabling a connection such that one or more processors of the computer system, memory of the computer system (also referred to as memory) and the monitoring device are electrically connected to one another. The physical tap may allow communications from the one or more processors of the computer system to the memory to be transmitted to the monitoring device without interfering with the communications between the one or more processors and the memory.

The monitoring device may apply a communications filter to selectively capture a portion of the bus traffic and generate events. The communications filter may be configured to identify communications affecting one or more protected memory ranges. The protected memory ranges may include memory ranges containing privileged data associated with the hypervisor. For example, during initialization the hypervisor may cause data corresponding to executing code of the hypervisor to be stored in memory. The executing code may include an operating system of the hypervisor which enables the hypervisor to perform various functions, such as instance management. For example, the instances may contain one or more virtual devices corresponding to one or more physical resources of the computing system, the hypervisor may enable operation of the instances by allowing the one or more virtual devices to access the one or more corresponding physical resources. After the hypervisor is initiated but before code corresponding to the instance is run, the current state of the system may be saved. The computing system may then determine one or more memory ranges of the executing code of the hypervisor and store information corresponding to the one or more memory ranges such that the information is accessible to the monitoring device. The monitoring device may then retrieve the information corresponding to the one or more memory ranges and generate the communications filter based at least in part on the information. The communications filter may contain information corresponding to the memory ranges of the executing code of the hypervisor, after the hypervisor has completed initialization.

The generated events captured by the communications filter may include one or more operations to protected areas of memory. For example, a particular intrusion attempt may include a write operation to a particular memory range containing executing code of the hypervisor, where the particular memory range is identified in the communications filter. The monitoring device may be configured to identify a protected communication associated with an operation, such as a write operation, to the one or more protected areas of memory. The monitoring device may further be configured to publish the event to an event stream in response to identifying the protected communication. An administrative system may examine the generated events included in the event stream in order to take corrective actions such as halting the computer system.

The administrative system may be configured to receive one or more events from the event stream. The administrative system may analyze events associated with one or more computer systems. The administrative system may also monitor the one or more computer systems based at least in part on the events published to the event stream by the one or more computer systems. For example, the monitoring device connected to a particular computer system may publish an event to the event stream. The administrative service may analyze the event and determine to monitor the particular computer system. The administrative system may monitor the particular computer system for a period of time collecting data corresponding to the operation of the computer system and the intrusion. The administrative system, after expiration of the period of time, may then determine one or more actions to perform in response to detecting hypervisor intrusions in the monitored computer system such as firing an alarm, halting the computer system, restarting the computer system, restoring a previous state of the computer system, deleting the memory of the computer system, continuing to monitor the computer system or any other actions suitable for computer system management. The administrative system may be capable of bi-directional communication with the monitoring device in order to transmit the one or more commands to the computer system and monitoring device.

The computer system may communicate with the monitoring device through one or more command communications. The processors of the computer system may cause a write operation to write instructions to a particular portion of the memory. The instructions may include addresses corresponding to the one or more protected memory ranges which the monitoring device is responsible for monitoring. The monitoring device may be configured to identify a particular command communication associated with the write operation to the particular area of the memory and decode the particular command communication. As an example, the computer system and monitoring device may be configured with a physical address for the particular area of the memory, upon booting, the computer system may reserve the particular area of the memory for command communications. The computer system may initialize the hypervisor and identify the one or more protected memory ranges associated with critical hypervisor functions. The computer system may instruct the monitoring device to begin monitoring the one or more protected memory ranges by writing addresses of the one or more protected memory ranges to the physical address for the particular area of the memory designated for command communications. The computer system may contain executable instructions that when executed by the one or more processors of the computing system may prevent the execution of untrusted executable instructions until the monitoring device begins monitoring the one or more protected memory areas. The monitoring device may also be configured to publish an event if the monitoring device is not instructed to begin monitoring within a predetermined amount of time from the computer system booting.

FIG. 1 is an illustrative example of an environment 100 illustrating various aspects of the present disclosure. As noted above, techniques described herein are applicable to intrusion detection and prevention systems for one or more computer systems executing hypervisors and instances. Accordingly, FIG. 1 shows a central processing unit (CPU) 102 (also referred to as a processor) that may be communicatively coupled to a protected memory 106. A communications channel 108 between the processor 102 and the protected memory 106 may be monitored by a monitoring device 104. The communications channel 108 may be any suitable communications channel or combinations thereof such as an internal bus, external bus, serial bus, parallel bus, control bus, address bus, data bus, front side bus, network interface, integrated chip, crossbar switch, switch, router or any other communications channel useable for transmitting one or more operations.

The monitoring device 104 may also be communicatively coupled to the communications channel 108 such that at least a portion of the communications transmitted between the processor 102 and the protected memory 106 are replicated within the monitoring device 104. In various embodiments, the monitoring device 104 is coupled to the communications channel 108 through a tap or other similar device. For example, the communications channel 108 may be a computer system bus connecting the processor 102 to the protected memory 106. The monitoring device 104 may include a physical connection to the bus configured to transmit an electrical signal to the monitoring device 104. The physical connection may include a conductive wire connected directly to the communications channel 108 that may enable at least a portion of the communications traveling over the communications channel 108 to be transmitted over the conductive wire to the monitoring device 104. The monitoring device 104 may include an application-specific integrated circuit (ASIC), a Field-programmable gate arrays (FPGA) or microcode configured to enable the monitoring device to perform various operations in accordance with the present disclosure.

Once received by the monitoring device 104, the replicated communications may be filtered by one or more communications filters to determine if the communication contains one or more operations corresponding to the protected area of memory 106. If a particular communication transmitted over the communications channel 108 contains an operation corresponding to the protected memory 106, the communications may be analyzed by an anomaly detector, to be described in greater detail below in connection with FIG. 5. The anomaly detector may contain one or more instructions indicating one or more actions to take in response to receiving a communication containing an operation on the protected area of memory 106. The one or more actions performed by the anomaly detector may include publishing information corresponding to the communication to an event stream. Publishing to the event stream may include transmitting information over a network to an administrative service. The network may be any suitable network such as the Internet, a local area network, wide area network or any other suitable communications network and/or other networks noted herein and/or combinations of networks.

The administrative service may receive one or more events corresponding to operations performed on the protected memory 106 and analyze the events to determine if the one or more events correspond to an intrusion or other malicious attack. The administrative service may determine, based at least in part on a portion of the one or more events, to monitor the computing system corresponding to the one or more events. The administrative service may request from the monitoring device 104 additional data, the additional data may include data corresponding to one or more signals transmitted over the communications channel 108 the monitoring device 104 is monitoring.

Figure 2:
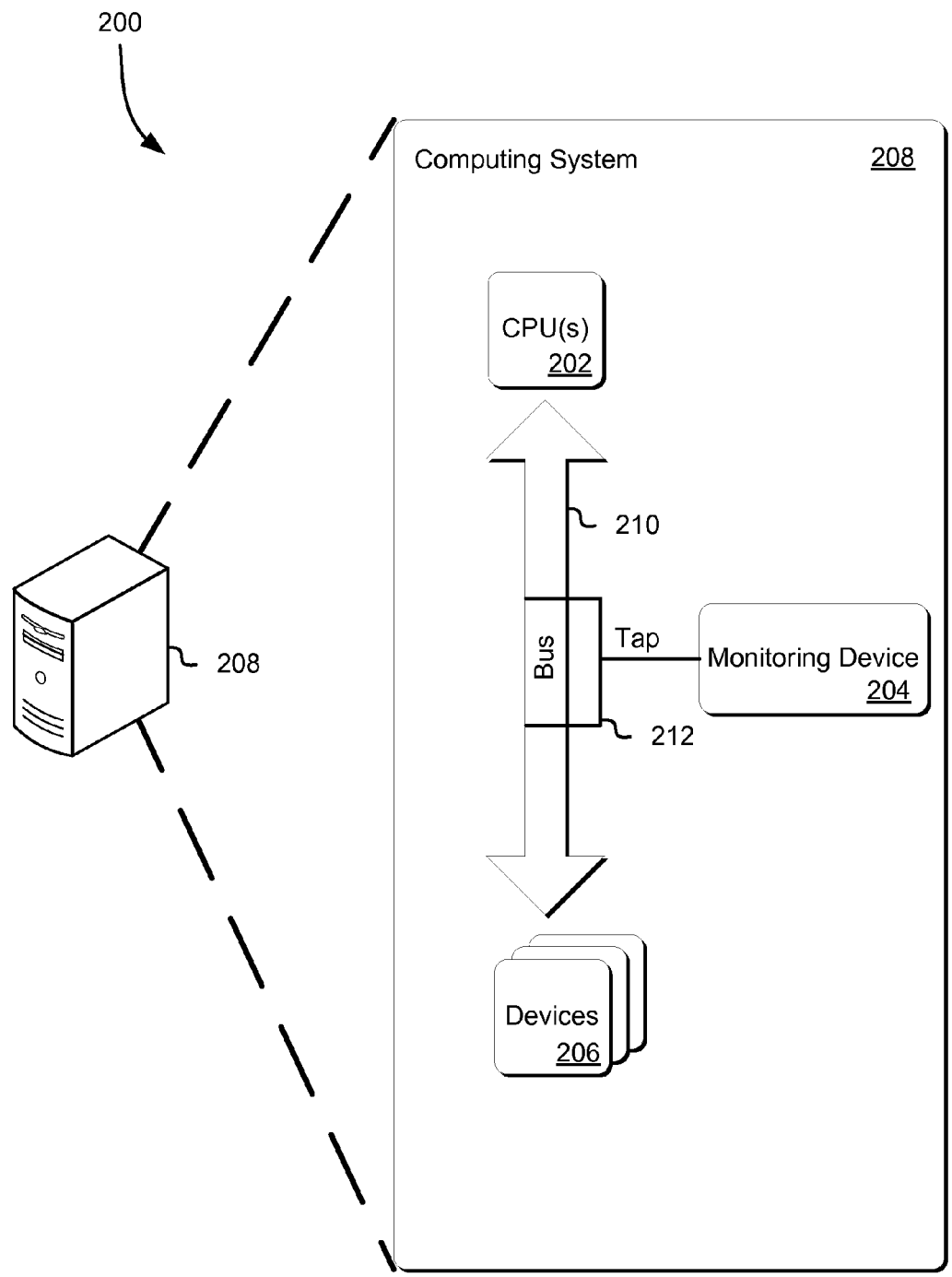
FIG. 2 shows an illustrative example of an environment in which various embodiments can be practiced.

FIG. 2 is an illustrative example of an environment 200 illustrating various aspects of the present disclosure. As noted above, techniques described herein are applicable to one or more computer systems where a monitoring device may be connected. Accordingly, FIG. 2 shows a computing system 208, the computing system may be part of a larger system operated by a service provider. For example, the computing system 208 may be part of a data center operated by the service provider in order to provide computing resources and services to one or more users. The computing system 208 may be a collection of computing resources collectively configured to execute a hypervisor and one or more virtual machine instances. The computing resources of computer system 208 may include one or more processors 202 and one or more other devices 206. The processors 202 and the devices 206 may be communicatively coupled through a bus 210. The bus 210 may enable signals to be transmitted between the processor 202 and the devices 206.

The computing device 208 may contain a motherboard or other printed circuit board (PCB) to which the processors 202 and the devices 206 may be connected. The motherboard may also include the bus 210 which enables communication between the processors 202 and the devices 206. The bus 210 may include one or more motherboard traces connecting the processors 202 and the devices 206. The motherboard traces may be conductive wires configured to carry a signal and/or current over the conductive wires to various resources in the computing system 208. In various embodiments, a tap 212 is placed on the bus 210 at one or more locations along a motherboard trace. The tap 212 may connect the monitoring device 204 to the bus 210, allowing the monitoring device to monitor communications between the processors 202 and the devices 206. The tap 212 may cause signals transmitted over the bus 210 to be transmitted to the monitoring device 204. In some embodiments, the tap 212 may cause some signal loss and degradations over the bus 210. However, the tap 212 may still allow communications between the processors 202 and device 206 to be transmitted across the bus 210 without interference.

The tap 212 may be connected directly to the bus 210 or may be connected to the bus 210 through one or more intervening structures. For example, the tap 212 may be connected at one or more end points of the bus 210, such as the one or more of the processors 202 of the computing system. In accordance with the present disclosure the tap 212 may be connected to the bus 210 using a variety of different structures. The tap 212 may be integrated into a resource of the computing system. For example, the tap 212 may be included in an integrated circuit with a memory controller of the computer system and connected to the bus 210 through the memory controller. The tap 212 may be connected to one or more intervening structures that terminate at the bus 210. For example, the tap 212 may be connected to one end of a motherboard trace that connects one or more resources of the computing system to the bus at the other end of the motherboard trace.

Figure 3:
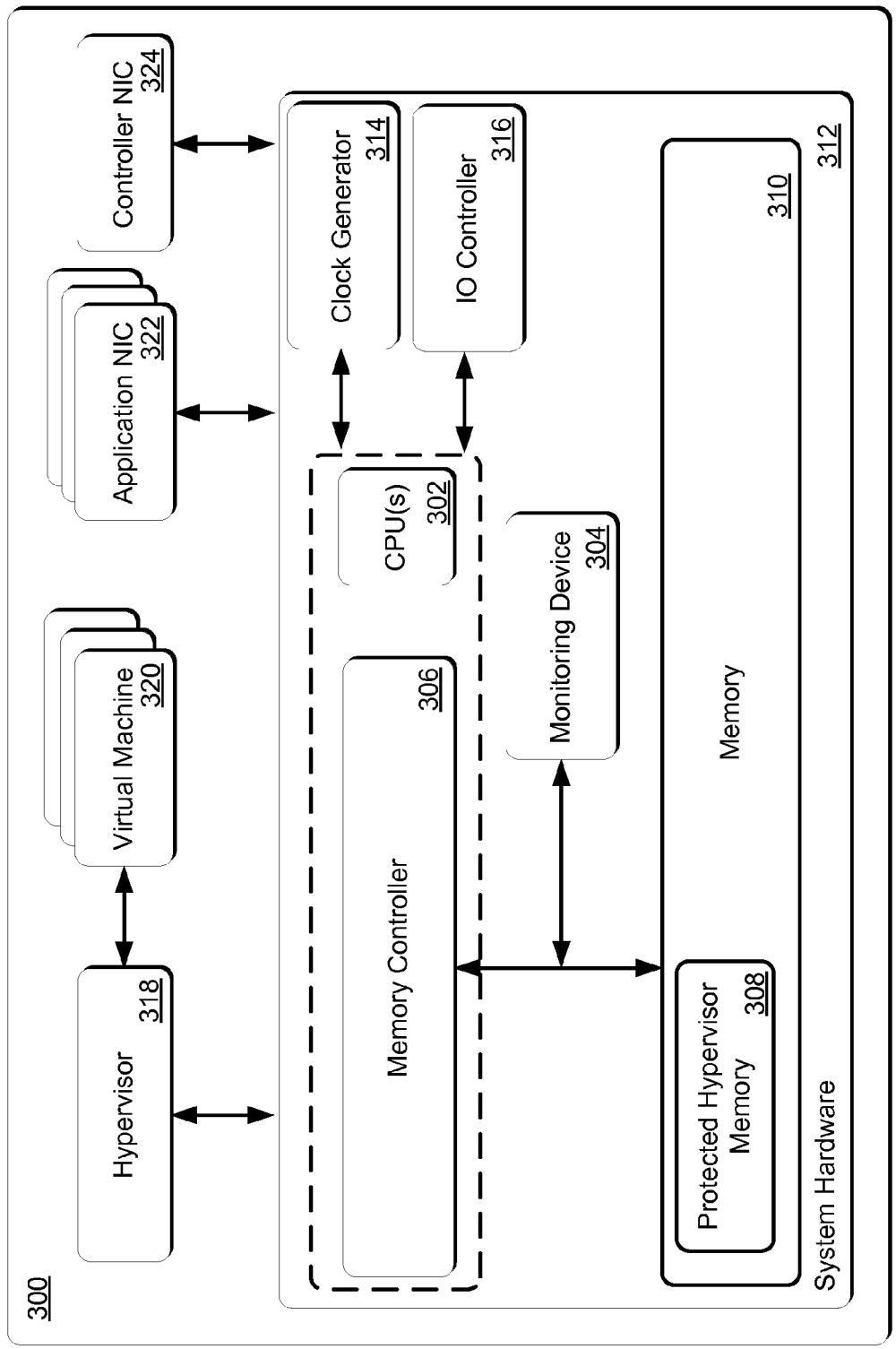
FIG. 3 shows an illustrative example of a device with which various embodiments can be practiced.

FIG. 3 is an illustrative, simplified block diagram of a computing system 300 that may be used to practice at least one embodiment of the present disclosure. In various embodiments, the computing system 300 may additionally provide storage used to implement any of the systems illustrated herein and described above, such as the computing system described above in connection to FIG. 2. For example, the computing system 300 may be used to execute virtual machine instances, monitor the instances, manage the instance and perform one or more intrusion detection operations. For example, the computing system 300 may execute a hypervisor 318 to enable management and operations of one or more virtual machines 320. The hypervisor 318 may have access to one or more privileged areas of the computing system 300 in order to perform various management functions. Although the hypervisor 318 is shown in FIG. 3 as a bare metal hypervisor, the hypervisor 318 may be a bare metal hypervisor or hosted hypervisor. Furthermore, although only one hypervisor 318 is shown in FIG. 3 for clarity, the system may execute multiple hypervisors 318 in accordance with the present disclosure.

As shown in FIG. 3, the computing system 300 may include system hardware 312, the system hardware includes one or more central processing units 302 (also referred to as processors for simplicity) that may be communicatively coupled to a number of systems, such as the memory 310, memory controller 306, monitoring device 304, clock generator 314, application network interface card (NIC) 322, controller NIC 324, and input output (10) controller 316. The memory 310 may provide a computer-readable storage medium for storing data that may provide the functionality of at least one embodiment of the present disclosure. The data stored in the memory 310 (programs, code modules, instructions) that, when executed by one or more processors 302, may provide the functionality of one or more embodiments of the present disclosure. These application modules or instructions may be executed by the one or more processors 302. The memory 310 may additionally provide storage for protected hypervisor memory 308. The memory 310 may also provide storage for the virtual machines 320 executing on computing system 300.

The protected hypervisor memory 308 may include one or more memory ranges of memory 310. The protected hypervisor memory 308 may be written to memory 308 by the hypervisor 318 during initializing on the hypervisor 318. Instructions may be loaded into the memory 310 of computing system 300 that cause computing system 300 to encode the memory address of the protected hypervisor memory 308 into a communications filter of the monitoring device 304 to be discussed in greater detail below in connection with FIG. 5. The computing system 300 may communicate with the monitoring device 304 using command communications. The computing system 300 and the monitoring device 304 may determine a particular area of memory 310 to use for communications. The computing system 300 may cause information to be written in to the particular area of memory 310 and the monitoring device 304 may read communications from the particular area of memory 310. For example, the computing system 300 may cause information corresponding to the memory address of the protected hypervisor memory 308 to be written to the particular area of memory 310. The monitoring device 304 may retrieve the information from the particular area of memory 310 and begin monitoring the memory address.

The memory controller 306 may be a collection of computing resources collectively configured to manage data flow between the memory 310 and one or more other resources in computing system 300. The memory controller 306 may include a digital circuit which manages the flow of data going to and from the memory 210. The memory controller 306 may be integrated into the processor 302, shown as a dashed rectangle in FIG. 3. Still in accordance with the present disclosure, the memory controller 306 may be separate from the processor 302 and connected to the processor 302 through a bus.

The clock generator 314 may be a collection of computing resources collectively configured to output a signal configured to synchronize operations between the resources in the computing system 300. The clock generator 314 may include a circuit that produces a clock signal, such as a square signal or other complex signal, configured to synchronize the operations of one or more circuits of computing system 300. The clock generator 314 may include a resonant circuit and an amplifier.

The application NIC 322 and the controller NIC 324 may be network interfaces connected to the computing system 300. The application NIC 322 may be a collection of computing resources collectively configured to transmit application data, such as virtual machine 320 data, over a network to one or more other computing systems. The controller NIC 324 may be a collection of computing resources collectively configured to transmit administrative and management data over the network to one or more management services or administrative services. Although only one application NIC 322 and controller NIC 324 are shown in FIG. 3, multiple application NICs 322 and controller NICs 324 may be connected to computing system 300 in accordance with the present disclosure. The application NIC 322 may be configured to send and receive application data quickly, including application data to and from one or more other services of the service provider or one or more customers operating virtual machines 320. The controller NIC 324 may be configured to send and receive management information for the computing system 300 from one or more services of the service provider, such as the administrative service, described in greater detail below in connection with FIG. 4.

The IO controller 316 may be a collection of computing resources collectively configured to enable the processor 302 to connect to and control resources and other peripherals connected to computing system 300. The IO controller 316 may be communicatively coupled to the processor 302 through a bus. The IO controller 316 may be integrated into a motherboard or PCB of the computing system 300. In various embodiments, the memory controller 306, the IO controller 316 and the processor 302 may be integrated into a single circuit.

The virtual machines 320 may be operated by one or more customers of the service provider. The virtual machines 320 may be loaded into memory 310 of the computing system 300 and executed by the processors 302. As described above, the hypervisor 318 manages the virtual machines 320. The hypervisor 318 may provide hardware virtualization for the virtual machines 320 and manage the virtual machines' 320 interaction with the physical resources on the computing system 300. The virtual machines 320 may contain virtualized hardware, the virtualized hardware may include one or more virtual central processing units, virtual memories, virtual disks and/or any other virtualized devices suitable for use in a virtual machine. The virtual machine may also execute a guest operating system with one or more applications. The guest operating system or the one or more applications may generate one or more operations to be executed by the virtualized hardware. The hypervisor may translate the one or more operations such that performance of the one or more operations is completed by one or more physical resources of the computing system 300.

Figure 4:
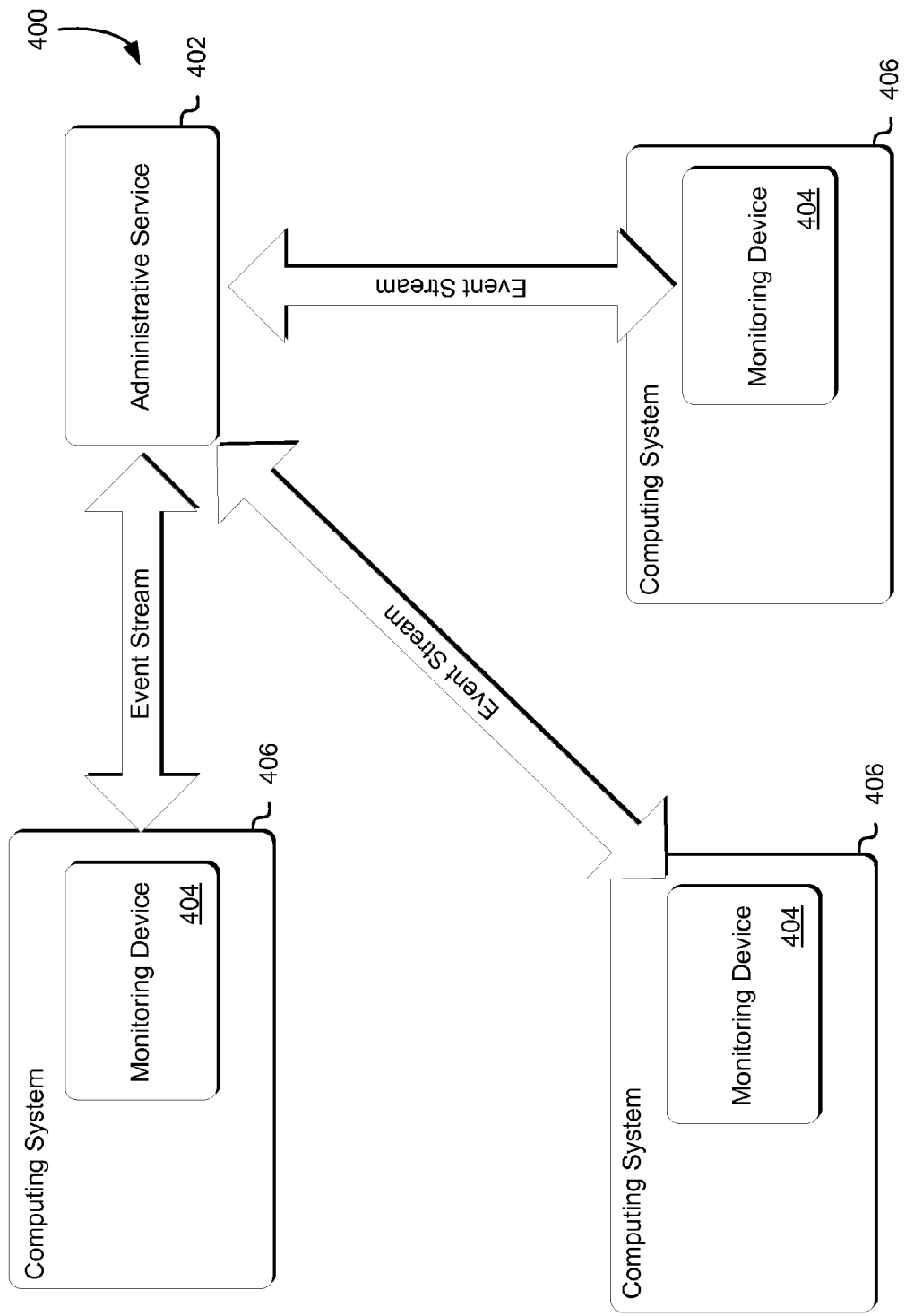
FIG. 4 shows an illustrative example of an environment in which various embodiments can be practiced.

FIG. 4 is an illustrative example of an environment 400 illustrating various aspects of the present disclosure. As noted above, techniques described herein are applicable to an administrative service monitoring the operations of one or more monitoring devices in order to detect and prevent various malicious attacks on computer systems, including a monitoring device. Accordingly, FIG. 2 shows an administrative service 402 receiving information corresponding to operations executed by one or more computing systems 406 in an event stream. The administrative service 402 may be a collection of computing resources collectively configured to manage one or more monitoring devices 404 over a network. The monitoring devices 404 may capture operations of the computing devices 406 and determine one or more operations that may correspond to a possible intrusion event (also referred to as an event) and transmit information corresponding to the event to the administrative service 402. For example, the monitoring devices 404 may capture write operations to a protected area of memory. The monitoring devices 404 may then transmit, to the administrative service 402, information corresponding to the event such as a time stamp of the event, one or more operations included in the event, one or more computing resources involved in the event, information identifying the monitoring device and/or computing system, the memory location of the event, the application responsible for generating the one or more operations or any other information suitable for detecting an intrusion or other malicious attack.

The administrative service 402 may receive multiple event streams from corresponding monitoring devices 404 or one or more other services of the service provider may receive the different event streams from the corresponding monitoring devices 404 and the one or more other services may transmit a single event stream to the administrative service 402. The monitoring devices 404 may publish events to the event stream contemporaneously or near contemporaneously with the event, or the monitoring device may store multiple events and publish the multiple events to the event stream at the same time. The administrative service 402 may be configured to receive events from the event stream and analyze the events in order to determine one or more actions (including taking no action) to be performed by the monitoring device 404 based at least in part on the event. Upon receipt of an event from the event stream, the administrative service 402 may determine, based at least in part on the event, the particular computing system 406 and the particular monitoring service 404 responsible for publishing the event to the event stream.

The administrative service 402 may then analyze the event based at least in part on information included in the event. For example, the event may include information corresponding to a request to write a particular piece of data to a memory range protected by the monitoring device 404 connected to the computing device 406. The administrative service 402 may analyze the information, such as the particular piece of data or the owner of the request, and determine one or more operations to perform based at least in part on the analyzed information. The one or more operations may include rebooting the computing system 406, continuing to monitor the computing system 406 by the monitoring device 404, restore a previously saved state of the computing device 406, transmit a warning to one or more devices, delete the memory of the computing device 406, cause one or more virtual machines executing on the computing device 406 to be terminated, repair one or more memory ranges of the computing device 406 or any other operation suitable for remediating a malicious attack on a computing system.

The administrative service 402 may be configured to communicate bi-directionally with the monitoring device 404 and/or the computing devices 406. The administrative service 402 may communicate with the monitoring device 404 and/or the computing devices 406 through a network interface such at the controller NIC described above in connection with FIG. 3. The administrative service 402 may transmit commands over the network interface to the monitoring device 404 and/or the computing devices 406. For example, the administrative service may analyze one or more events received from the monitoring device 404 and determine that more information is required. The administrative service 402 may transmit over the network interface one or more commands causing the monitoring service to transmit the requested information in response to the command. In another example, the administrative service may analyze one or more events received from the monitoring device 404 and determine that an intrusion has occurred in the computing device 406. The administrative service 402 may transmit through the network interface a reboot command to the monitoring service 404. The monitoring service may cause the computing system 406 to reboot in response to the command transmitted by the administrative service 402.

Figure 5:
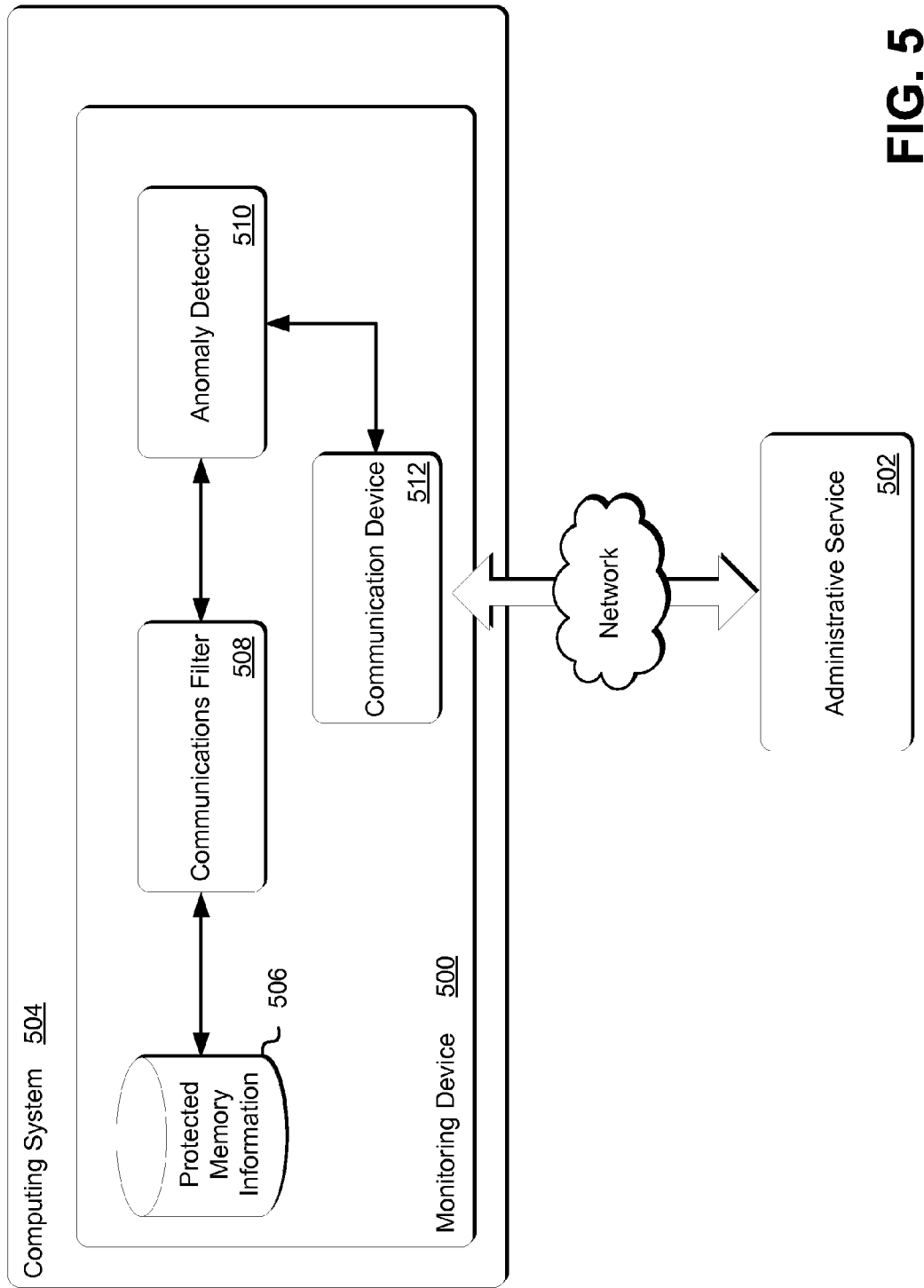
FIG. 5 shows an illustrative example of a monitoring device with which various embodiments can be practiced.

FIG. 5 is an illustrative, simplified block diagram of a monitoring device 500 that may be used to practice at least one embodiment of the present disclosure. In various embodiments, the monitoring computing system 300 may be used to implement any of the systems illustrated herein and described above, such as the monitoring device described above in connection with FIG. 3. For example, the monitoring device 500 may be used to monitor one or more communications channels in the computing system 504 and protect one or more memory ranges of the computer system's 504 memory. The monitoring device 500 may include a protected memory information 506, a communications filter 508, an anomaly detector 510 and a communications device 512. The protected memory information 506 may contain location information for one or more protected areas of memory. The protected areas of memory may be memory locations for critical hypervisor functions, such as the functions that allow the hypervisor to access privileged memory and systems. The protected memory information 506 may also include other privileged memory areas such as the operating system, firmware, the basic input/output system, the processor cache or any other critical functions stored in memory.

The protected memory information 506 may be a collection of computing resources collectively configured to store one or more memory addresses or memory ranges corresponding to areas of memory containing privileged information. The protected memory information 506 may be generated by the computing system 504 during initialization of the computer system or one or more subsystems of the computer system. For example, the computer system 504 may cause a hypervisor to be initialized and loaded into memory of the computer system 504. Initialization of the hypervisor may cause executable code corresponding to the critical functions of the hypervisor to be loaded into the memory of the computer system 504. The computer system 504 or a component thereof may write memory location information corresponding to the memory location of the critical functions loaded into memory as a result of the hypervisor being initialized. The memory location information may be written to a particular area of memory accessible by the monitoring device 500. Once the monitoring device 500 receives a command from the computing device 504 to begin monitoring, the monitoring device 500 may retrieve the memory location information from the particular area of memory and store the information into the protected memory information 506. In various embodiments, the monitoring device 500 may, after the expiration of a grace period once the hypervisor has been initialized, begin monitoring the hypervisor without a command from the computer system 504.

The communications filter 508 may be a collection of computing resources collectively configured to filter communication captured from one or more communications channels of the computing device 504. The communications channels may include a bus as described above in connection with FIG. 2. The communications filter 508 may be configured to determine communications between resources of the computing device and protected areas of memory. For example, the communications filters 508 may be configured to determine communication between a processor of the computing system 504 and the memory ranges contained in the protected memory information 506. In various embodiments, the communications filter 508 is a data structure such as a table including memory ranges the monitoring device 500 is assigned to protect. The communications filter 508 may be configured such that communications transmitted over the bus that do not affect the protected memory ranges are discarded or otherwise ignored by the monitoring device 500. The communications filter 508 may further be configured to determine a particular type of communication. For example, the communications filter may be configured to determine communications including write operations to memory ranges contained in the protected memory information 506. The communications filter 508 may cause the monitoring device to ignore communications that the communications filter 508 determines do not include memory ranges contained in the protected memory information 506. The communications filter 508 may direct communications that do include memory ranges contained in the protected memory information 506 to the anomaly detector 510.

The anomaly detector 510 may be a collection of computing resources collectively configured to determine one or more actions to perform in response to the communications filter 508 detecting a communication including a memory range contained in the protected memory information 506. Although the anomaly detector 510 is shown in FIG. 5 as part of the monitoring device 500, in various embodiments, the anomaly detector 510 may be part of one or more other systems such as the administrative service 502. The anomaly detector 510 may cause the computer system to reboot in response to receiving a communication attempting to perform one or more operations on a protected area of memory. The anomaly detector 510 may cause the monitoring device 500 to flood the computing system 504 bus and prevent communications from being transmitted between resources of the computer system. The monitoring device 500 may flood the computing system 504 bus by running a current across the tap and into the computing system 504. This may cause the computing system 504 to reboot based at least in part on the inability of the computing system 504 bus to transmit communications between the resources of the computing system 504.

The anomaly detector 510 may also cause information corresponding to the communication, including a memory range contained in the protected memory information 506 to be transmitted to the administrative service 502. For example, the communications filter 508 may determine one or more communications attempting to write data to a memory range contained in the protected memory information 506. The communications filter 508 may direct the one or more communications to the anomaly detector 510, the anomaly detector 510 may then determine information corresponding to the one or more communications to be published to the event stream. The anomaly detector 510 may cause the communications device 512 to publish information corresponding to the one or more communications to the event stream based at least in part on the determination.

The communications device 512 may be a collection of computing resources collectively configured to transmit information to the administration service. The communications device 512 may be a NIC, such as the controller NIC described above in connection with FIG. 3. In various embodiments, the monitoring device 500 may not contain an independent communications device but may instead share a communications device with the computing system 504. The communications device 512 may receive information from the anomaly detector 510 corresponding to communications between resources of the computing device attempting to access one or more memory ranges contained in the protected memory information 506. The communications device may configure the information to be transmitted over a network. For example, the communications device may configure the information in accordance with Internet Protocol in order to transmit the information over a network to the administrative service 502.

Figure 6:
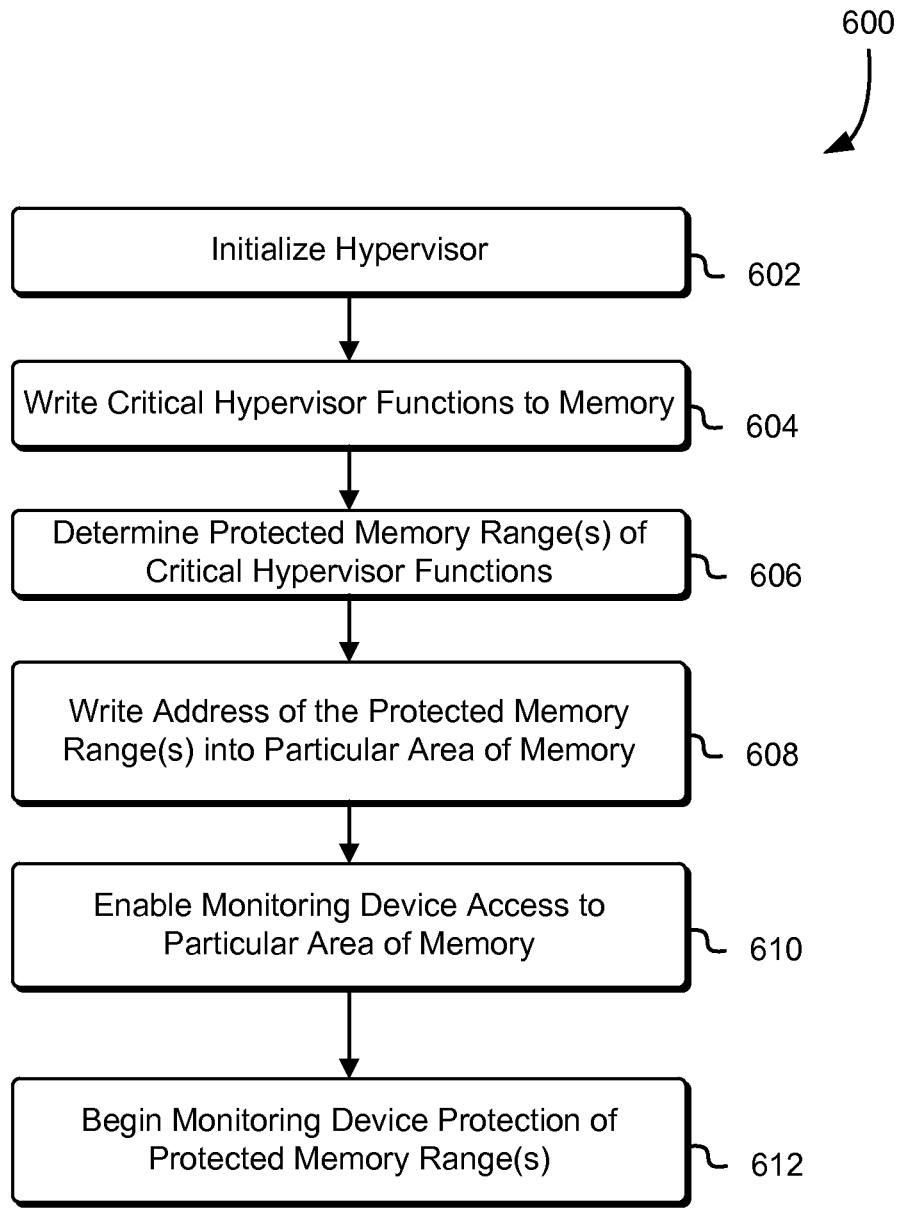
FIG. 6 shows an illustrative example of a process for generating a communications filter in accordance with at least one embodiment.

FIG. 6 shows an illustrative example of process 600 which may be used to determine one or more protected areas of memory. The process 600 may be performed by any suitable system, such as by the computing system 300 as described in connection with FIG. 3 and/or an appropriate component thereof, such as by the processor 302. Returning to FIG. 6, in an embodiment, the process 600 includes initializing a hypervisor 602. Memory of the computer system may contain executable code that causes the computer system to initialize the hypervisor when the computer system boots. Initialization of the hypervisor 602 may include the computer system or a component thereof to writing critical hypervisor functions into the memory 604 of the computing system, such as the protected hypervisor memory 308 described above in connection to FIG. 3.

The computer system may further include executable instructions contained in memory that cause the computer system or component thereof to determine the memory location of the critical hypervisor function 606. The memory location may include one or more memory ranges containing a starting memory address and an ending memory address. The computer system or component thereof may then write the address of the one or more protected memory ranges into a particular area of memory 608. For example, the computer system may cause one or more components of the computer system to write to memory the starting address and the ending address for the memory range of the protected hypervisor memory into memory address two hundred. The computing device or component thereof may the pass a pointer to the monitoring device, where the pointer points to memory address two hundred. The pointer may enable the monitoring device to access the particular area of memory 610. The computing system and monitoring device may also agree on a particular area of memory designated to contain the memory location of the hypervisor protected memory thereby enabling the monitoring device to access the particular area of memory 610. The monitoring device may then use the information contained in the particular area of memory 610 to begin monitoring the protected memory ranges 612. For example, the monitoring device may generate the communications filter based at least in part on the information contained in the particular area of memory and filter communications traveling over the computer system bus, using the communications filter, in order to detect signals affecting the protected memory ranges.

Figure 7:
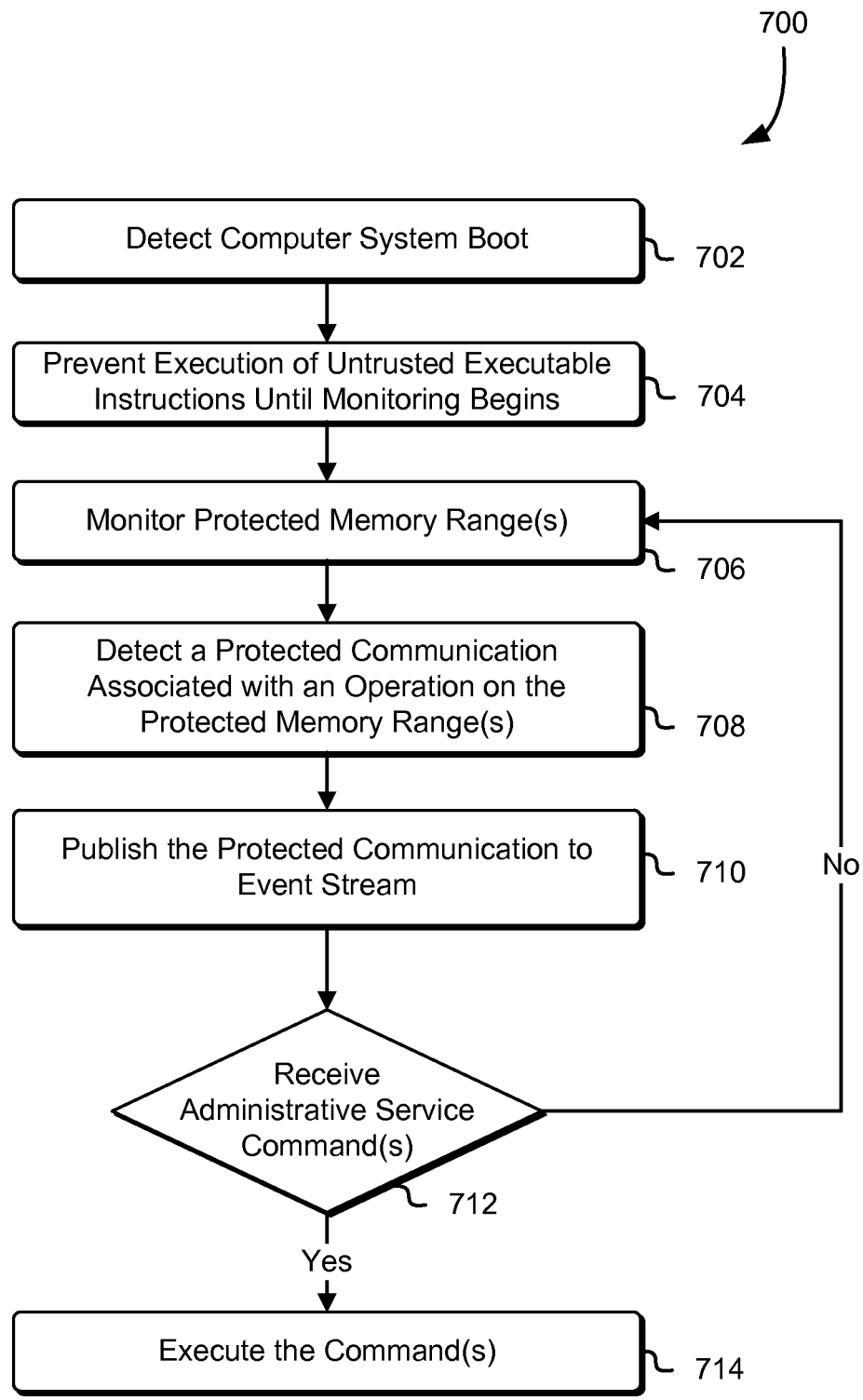
FIG. 7 shows an illustrative example of a process for monitoring a computer system in accordance with at least one embodiment.

FIG. 7 shows an illustrative example of process 700 which may be used to monitor one or more protected areas of memory. The process 700 may be performed by any suitable system, such as by the computing system 300 as described in connection with FIG. 3 and/or an appropriate component thereof, such as by the monitoring device 304. Returning to FIG. 7, in an embodiment, the process 700 includes detecting the computer system booting up 702. The monitoring device may detect the computer system booting based at least in part on receiving communications through the tap on the bus. Booting the computer system may include initializing a hypervisor and determining one or more protected areas of memory. During a computer system boot, untrusted executable instructions may be prevented from being executed 704. The computer system or component thereof may cause untrusted executable instructions to be removed from the processing queue or otherwise be prevented from executing.

Returning to FIG. 7, the process 700 includes monitoring the protected memory ranges 706. Monitoring the protected memory ranges 706 may be performed by the monitoring device 500 as described above in connection with FIG. 5. The monitoring device may capture communications, transmitted across the computer system bus, through the tap. The communications filter in the monitoring device may detect a protected communication associated with an operation on the protected memory ranges 708. The protected communication may then be directed to the anomaly detector in the monitoring device, as described above in connection with FIG. 5. The anomaly detector may then cause the communication to be published to the event stream 710. The communication may be published to the event stream 710 by the communications device contained in the monitoring device, as described above in connection with FIG. 5.

The monitoring device or component thereof may determine if one or more commands have been received from the administrative service 712. For example, the communications device included in the monitoring device may receive over a network one or more commands from the administrative service. The communications device may direct the commands to the monitoring device and the monitoring device may execute the one or more commands 714. The monitoring device may execute the one or more commands by performing various operations corresponding to the commands, such as described above in connection with FIG. 5. For example, the monitoring service may cause the communications device to transmit additional information to the administrative service in response to the one or more commands. In another example, the monitoring service may cause the computing system to halt the computer systems processors in response to the one or more commands. The monitoring device may also cause a copy of the computer systems memory to be persistently stored before the computer system processors are halted such that the memory may be analyzed in order to determine information corresponding to the intrusion. The monitoring device or the administrative service may also cause an alert to be transmitted. The alert may be transmitted to one or more individuals responsible for security on the computer system. The alert may include an indication that the computer system detected an intrusion and one or more operations where performed. If no commands are received from the administrative service process 700 may return to monitoring the protected memory ranges 706. For example, the monitoring device may continue to capture and filter communications transmitted over the computer system bus until the monitoring device receives one or more commands from the administrative service indicating that the monitoring device should no longer monitor the computing device.

Numerous variations of process 700 may be performed in accordance with the present disclosure. For example process 700 may include performing one or more corrective actions in response to detecting the protected communication associated with the operation on the protected memory ranges 708. Performing the one or more corrective actions may be done in combination with or instead of publishing the protected communication to the event stream 710 and the remaining operations of process 700. For example, the communications filter of the monitoring device may detect the protected communication associated with the operation on the protected memory ranges 708 and the monitoring device or component thereof may reboot the computing system. In another example, the communications filter of the monitoring device may detect the protected communication associated with the operation on the protected memory ranges 708. The anomaly detector of the monitoring device may then cause the communication to be quarantined such that the operations associated with the communication are not performed and cause the communication or a copy of the communication to be published to the event stream 710.

Figure 8:
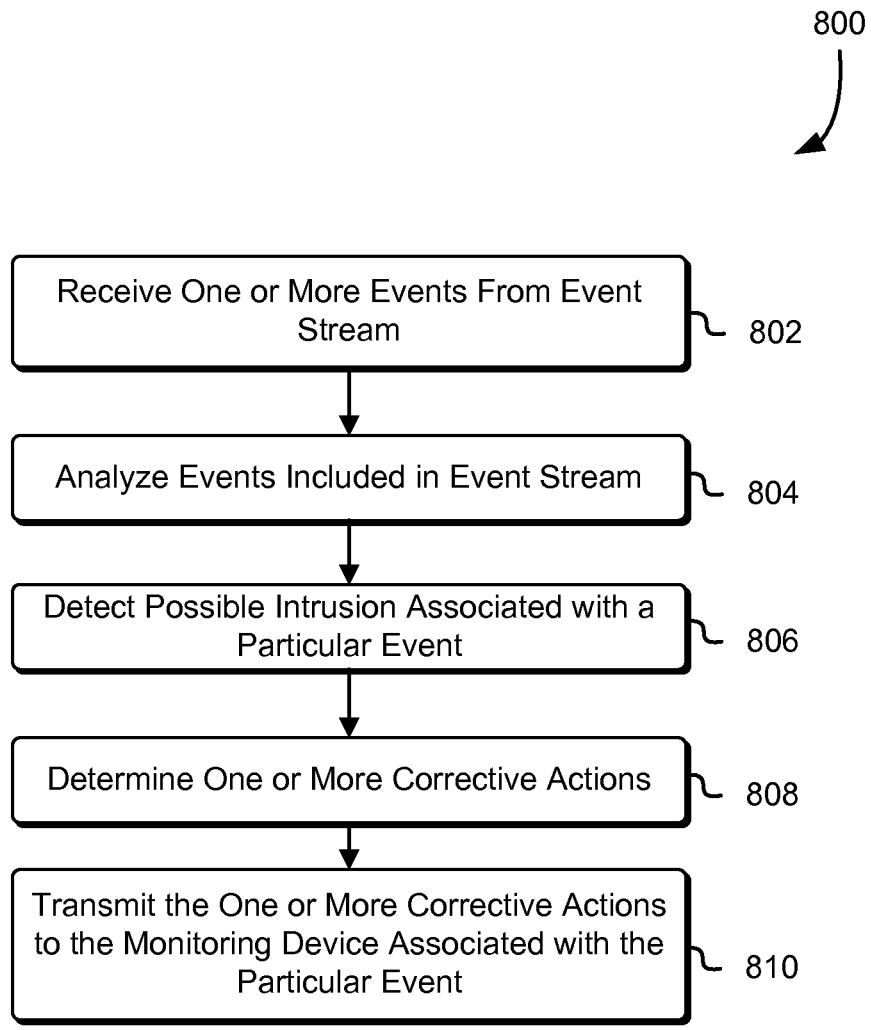
FIG. 8 shows an illustrative example of a process for administrating one or more computer systems in accordance with at least one embodiment.

FIG. 8 shows an illustrative example of a process 800 which may be used to analyze received information and determine one or more remedial actions. The process 800 may be performed by any suitable system, such as by the administrative service 402 as described in connection with FIG. 4. Returning to FIG. 8, in an embodiment, the process 800 includes receiving one or more events from an event stream 802. The events may correspond to communications transmitted over a computer system bus attempting to perform one or more operations on a protected area of computer system memory. The events may be transmitted by one or more monitoring devices as described in connection with FIG. 4. The administrative service may then analyze the one or more events included in the event stream 804. For example, the administrative service may analyze the event by comparing the event to one or more previously encountered malicious attacks.

The administrative service may then detect a possible intrusion or malicious attack associated with a particular event 806 based at least in part on the analyzed event. For example, the administrative service may analyze the event and determine that possibly malicious code has been written into protected memory of the computing system. The administrative service may then detect the possible malicious attack based on the analysis. Returning to FIG. 8, the process 800 includes determining one or more corrective actions 808. The one or more corrective actions may include requesting more data from the monitoring device associated with the possible intrusion or malicious attack in order to gather more information corresponding to the possible intrusion or malicious attack. The one or more corrective actions, for example, may include deleting one or more memory ranges and restoring the memories' previous states. The administrative service may then transmit the one or more corrective actions to the monitoring device associated with the particular event. In an embodiment, the one or more corrective actions may be transmitted directly to the computing system associated with the event.

Figure 9:
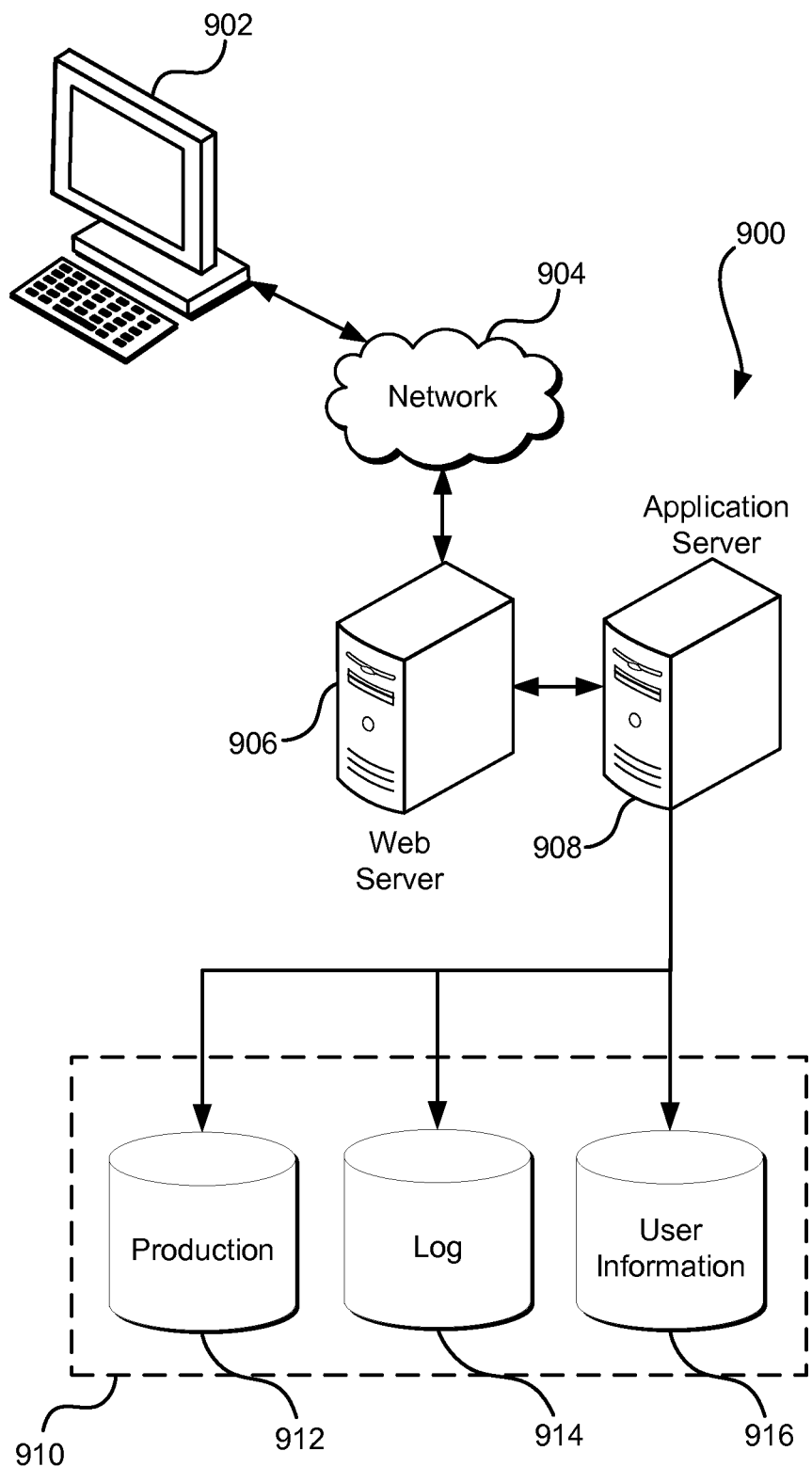
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
one or more processors;
hypervisor memory storing executable code of a hypervisor;
a bus communicatively coupled to the one or more processors and the hypervisor memory; and
a hypervisor monitoring device that is separate from a hypervisor executed by the one or more processors and connected to the bus such that the monitoring device receives at least a portion of signals transmitted from the one or more processors to the hypervisor memory, the hypervisor monitoring device configured to:
 receive, at the hypervisor monitoring device a first signal transmitted over the bus, where the signal includes a configuration message indicating one or more protected memory ranges of the hypervisor memory storing executable code of the hypervisor and requesting configuration of executable code of the hypervisor stored in the one or more protected memory ranges of the hypervisor memory;
 receive, at the hypervisor monitoring device one or more signals transmitted over the bus from the one or more processors to the hypervisor memory;
 determine, by the hypervisor monitoring device that at least one of the portion of the one or more signals affects a protected memory range of the one or more protected memory ranges of the hypervisor memory storing executable code of the hypervisor; and
 provide, by the hypervisor monitoring device, to an anomaly detector, the at least one signal, wherein the anomaly detector is configured to:
  perform one or more operations, wherein the one or more operations include a command through an administrative service to halt one or more processor of the system in response to the anomaly detector receiving the at least one signal corresponding to the protected memory range.

2. The system of claim 1, wherein the monitoring device is further configured to:
generate, based at least in part on one or more protected memory ranges of the hypervisor memory, a communications filter configured to detect signals corresponding to the one or more protected memory ranges; and
discard, based at least in part on the communications filter, one or more signals that do not correspond to the one or more protected memory ranges.

3. The system of claim 2, wherein the hypervisor memory includes instructions that when executed by the one or more processors of the system, cause the system to:
write one or more critical functions to the hypervisor memory;
determine the one or more protected memory ranges based at least in part on a location of the one or more critical functions in the hypervisor memory; and
transmit, to the monitoring device, the configuration message corresponding to the one or more protected memory ranges.

4. The system of claim 1, wherein the system further includes:
a network interface of the monitoring device and a network, configured to transmit data over a network to the administrative service; and
the monitoring device is further configured to publish the at least one signal to an event stream configured to transmit, through the network interface, information corresponding to at least one signal, to the administrative service.

5. The system of claim 4, wherein the monitoring device is further configured to:
receive through the network interface the command from the administrative service; and
perform one or more operations based at least in part on the command received through the network interface.

6. The system of claim 5, wherein the one or more operations includes the command to halt the one or more processors of the system.

7. A computer-implemented method for detecting intrusions on a computer system, comprising:
receiving a configuration for a communications filter;
receiving, from a tap connected to a bus, one or more communications transmitted over the bus between resources of the computer system;
determining a communication of the one or more communications that affects a restricted memory address of hypervisor memory storing executable code of a hypervisor and that is requesting configuration of executable code of the hypervisor stored at the restricted memory address of the hypervisor memory, the determining based at least in part on the communications filter;
receive an indication of one or more operations to perform based at least in part on the communication; and
performing at least one operation of the one or more operations, wherein the at least one operation includes a command through an administrative service to halt one or more processor of the system.

8. The computer-implemented method of claim 7, wherein the computer-implemented method further includes:
generating the communications filter based at least in part on the configuration and one or more restricted memory addresses; and
determining the communication that affects the restricted memory address based at least in part on the communications filter.

9. The computer-implemented method of claim 7, further comprising transmitting information corresponding to the communication to an administrative service and wherein the indication is received from the administrative service in response to transmitting the information.

10. The computer-implemented method of claim 7, wherein receiving the indication of the one or more operations to perform includes receiving the indication of the one or more operations to perform based at least in part on instructions contained in an anomaly detector.

11. The computer-implemented method of claim 7, wherein performing the at least one operation includes performing a different operation than the command that causes the one or more processors to halt.

12. The computer-implemented method of claim 11, wherein the different operation includes causing a copy of at least a portion of a memory of the computer system to be persistently stored.

13. The computer-implemented method of claim 11, wherein the different operation includes causing the computer system to transmit an alert.

14. A non-transitory computer-readable storage medium having collectively stored thereon executable instructions that, when executed by one or more processors of an anomaly detector, cause the anomaly detector to at least:
receive an indication of one or more signals affecting hypervisor memory transmitted over a bus and captured at a tap connected to the bus, wherein the one or more signals affect a restricted memory address corresponding to the hypervisor memory that stores executable code for a hypervisor and requests configuration of executable code of the hypervisor stored at the restricted memory address of the hypervisor memory;
determine one or more operations based at least in part on a portion of the one or more signals attempting to access the restricted memory address; and
perform the one or more operations including a command through an administrative service to halt one or more processor of the system.

15. The non-transitory computer-readable storage medium of claim 14, wherein the instructions that cause the anomaly detector to perform the one or more operations further include instructions that cause the anomaly detector to transmit one or more commands corresponding to the one or more operations to a monitoring device.

16. The non-transitory computer-readable storage medium of claim 15, wherein the instructions that cause the anomaly detector to transmit the one or more commands to the monitoring device further include instructions that cause the anomaly detector to transmit the one or more commands to the monitoring device over a network.

17. The non-transitory computer-readable storage medium of claim 14, wherein the instructions that cause the anomaly detector to perform the one or more operations further include instructions that cause the anomaly detector to transmit to a monitoring device to a command that causes the monitoring device to transmit a current over the tap such that the bus cannot transmit another signal.

18. The non-transitory computer-readable storage medium of claim 14, wherein the instructions that cause the anomaly detector to perform the one or more operations further include instructions that cause the anomaly detector to transmit an alert.

19. The non-transitory computer-readable storage medium of claim 14, wherein the instructions that cause the anomaly detector to receive the indication of the one or more signals affecting the memory transmitted over the bus and captured at the tap further include instructions that cause the anomaly detector to receive the indication from an event stream, wherein the event stream is transmitted from one or more monitoring devices and contains information corresponding to the one or more signals affecting the memory.

20. The non-transitory computer-readable storage medium of claim 14, wherein the instructions that cause the anomaly detector to perform the one or more operations further include instructions that cause the anomaly detector to halt one or more processors of a computer system.

\* \* \* \* \*